United States Patent
Martini

(10) Patent No.: US 9,380,077 B2
(45) Date of Patent: Jun. 28, 2016

(54) SWITCHING BETWEEN NETWORKS

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 57 days.

(21) Appl. No.: 13/962,832

(22) Filed: Aug. 8, 2013

(65) Prior Publication Data

US 2015/0046588 A1    Feb. 12, 2015

(51) Int. Cl.
G06F 15/173 (2006.01)
H04L 29/06 (2006.01)
H04L 29/08 (2006.01)

(52) U.S. Cl.
CPC ............ *H04L 65/1013* (2013.01); *H04L 63/18* (2013.01); *H04L 69/14* (2013.01); *H04L 67/34* (2013.01)

(58) Field of Classification Search
USPC ............ 709/221, 222, 223, 224; 726/1, 3, 25, 726/26, 29, 30; 713/154, 168, 169, 191; 717/173, 178; 455/405, 411
See application file for complete search history.

(56) References Cited

U.S. PATENT DOCUMENTS

| | | | |
|---|---|---|---|
| 7,957,348 B1 * | 6/2011 | Gallagher et al. | 370/331 |
| 8,056,143 B2 * | 11/2011 | Brown et al. | 726/29 |
| 8,316,237 B1 * | 11/2012 | Felsher et al. | 713/171 |
| 8,359,016 B2 * | 1/2013 | Lindeman et al. | 455/414.1 |
| 8,473,743 B2 * | 6/2013 | Freedman et al. | 713/169 |
| 8,613,070 B1 | 12/2013 | Borzycki et al. | |
| 8,793,774 B1 * | 7/2014 | Kumar et al. | 726/6 |
| 2004/0098715 A1 * | 5/2004 | Aghera et al. | 717/173 |
| 2007/0245409 A1 * | 10/2007 | Harris et al. | 726/5 |
| 2008/0137593 A1 | 6/2008 | Laudermilch et al. | |
| 2008/0183825 A1 * | 7/2008 | Alicherry et al. | 709/206 |
| 2009/0049537 A1 | 2/2009 | Chen et al. | |
| 2010/0112983 A1 * | 5/2010 | Walker et al. | 455/411 |
| 2010/0115582 A1 * | 5/2010 | Sapp et al. | 726/1 |
| 2010/0242097 A1 * | 9/2010 | Hotes et al. | 726/4 |
| 2010/0299719 A1 * | 11/2010 | Burks et al. | 726/3 |
| 2011/0167470 A1 * | 7/2011 | Walker et al. | 726/1 |
| 2011/0252240 A1 * | 10/2011 | Freedman et al. | 713/169 |

(Continued)

OTHER PUBLICATIONS

'Amtel' [online]. "Mobile App Management|Secure Mobile & Enterprise Apps Store—Amtel" 2013, [retrieved from the Internet on Jul. 17, 2013]. Retrieved from the Internet: http://www.amtelnet.com/mobile-device-management/mobile-apps-management-mam/  3 pages.

(Continued)

*Primary Examiner* — Saket K Daftuar
(74) *Attorney, Agent, or Firm* — Fish & Richardson P.C.

(57) ABSTRACT

Methods, systems, and apparatus, including computer programs encoded on computer storage media, for switching between parallel networks. One of the methods includes maintaining a plurality of parallel networks including a first network that precludes access to secure resources, and a second network that provides access both to unsecured resources and secured resources, enabling a user device access to connect to the first network, receiving input from the user device seeking access to one or more secured resources, in response to the received input, installing a device management profile on the user device, and causing the user device to switch from the connection to the first network to a connection to the second network.

30 Claims, 4 Drawing Sheets

(56) References Cited

U.S. PATENT DOCUMENTS

| | | | |
|---|---|---|---|
| 2011/0276683 A1* | 11/2011 | Goldschlag et al. | 709/224 |
| 2012/0129503 A1* | 5/2012 | Lindeman et al. | 455/414.1 |
| 2012/0131685 A1* | 5/2012 | Broch et al. | 726/30 |
| 2012/0173682 A1* | 7/2012 | Mantere et al. | 709/221 |
| 2012/0240183 A1* | 9/2012 | Sinha | 726/1 |
| 2012/0284401 A1* | 11/2012 | Visalli et al. | 709/224 |
| 2013/0007245 A1* | 1/2013 | Malik et al. | 709/223 |
| 2013/0007848 A1 | 1/2013 | Chaskar et al. | |
| 2013/0022030 A1 | 1/2013 | Hillier | |
| 2013/0054763 A1* | 2/2013 | Van der Merwe et al. | 709/220 |
| 2013/0081104 A1* | 3/2013 | Jung et al. | 726/1 |
| 2013/0122867 A1* | 5/2013 | Bayliss et al. | 455/411 |
| 2013/0132941 A1* | 5/2013 | Lindeman et al. | 717/176 |
| 2013/0143522 A1* | 6/2013 | Rege et al. | 455/405 |
| 2013/0196615 A1* | 8/2013 | Zalmanovitch et al. | 455/405 |
| 2013/0227636 A1 | 8/2013 | Bettini et al. | |
| 2013/0247144 A1* | 9/2013 | Marshall et al. | 726/1 |
| 2013/0247166 A1* | 9/2013 | Freedman et al. | 726/10 |
| 2013/0254837 A1* | 9/2013 | Brannon et al. | 726/1 |
| 2013/0254889 A1 | 9/2013 | Stuntebeck | |
| 2013/0268666 A1 | 10/2013 | Wilson et al. | |
| 2013/0275621 A1 | 10/2013 | Jungck | |
| 2013/0297662 A1 | 11/2013 | Sharma et al. | |
| 2013/0326614 A1* | 12/2013 | Truskovsky et al. | 726/19 |
| 2013/0340031 A1 | 12/2013 | Amit et al. | |
| 2014/0026198 A1 | 1/2014 | Isozaki et al. | |
| 2014/0053280 A1* | 2/2014 | Durazzo et al. | 726/28 |
| 2014/0101716 A1* | 4/2014 | Touboul | 726/1 |
| 2014/0259109 A1* | 9/2014 | Houston et al. | 726/3 |
| 2014/0282846 A1* | 9/2014 | Deweese et al. | 726/1 |
| 2014/0337925 A1* | 11/2014 | Marshall et al. | 726/4 |
| 2014/0359098 A1* | 12/2014 | Xu | 709/223 |

OTHER PUBLICATIONS

'Amtel' [online]. "Mobile Device Management MDM|Android MDM & IOS MEM—Amtel," 2013, [retrieved from the Internet on Jul. 17, 2013]. Retrieved from the Internet: http://www.amtelnet.com/mobile-device-management/, 4 pages.

Apple, "Deploying iPhone and iPad Mobile Device Management," Sep. 2012, 8 pages.

'Google Apps' [online]. "Google Apps Mobile Management: Devices—Google Apps Help," 2013, [retrieved from the Internet on Jul. 17, 2013]. Retrieved from the Internet: http://support.google.com/a/bin/answer.py?hl=en&answer=408863, 2 pages.

'Google Apps' [online]. "Google Apps Mobile Management: Org Settings—Google Apps Help," 2013, [retrieved from the Internet on Jul. 17, 2013]. Retrieved from the Internet: http://support.google.com/a/bin/answer.py?hl=en&answer=1408902, 4 pages.

'Google Play' [online]. "Google Apps Device Policy—Android Apps on Google Play," 2013, [retrieved from the Internet on Jul. 17, 2013]. Retrieved from the Internet: https://play.google.com/store/apps/details?id=com.google.android.apps.e 4 pages.

'ManageEngine' [online]. "Control USB|USB Device Management| Enable, Disable USB Devices," 2013, [retrieved from the Internet on Jul. 17, 2013]. Retrieved from the Internet: http://www.manageengine.com/desktop-management-msp/mobile-devic, 2 pages.

'Open Mobile Alliance,' [online]. "Mobile Device Management for All Devices Including iPhone & Android," 2012, [retrieved from the Internet on Jul. 17, 2013]. Retrieved from the Internet: http://openmobilealliance.org/about-oma/work-program/device-manage 5 pages.

'Zenprise' [online]. "Government Mobile Device Management," 2013, [retrieved from the Internet on Jul. 17, 2013]. Retrieved from the Internet: http://www.citrix.com/solutions/us-government/overview.html, 1 page.

Airwatch, "Bring Your Own Device (BYOD)," air-watch.com [online], brochure created Feb 21, 2013, [retrieved on Aug. 15, 2013]. Retrieved from the Internet: <URL: http://www.air-watch.com/downloads/brochures/AirWatch_brochure_BYOD.pdf > 2 pages.

Airwatch, "Mobile Device Management (MDM)," air-watch.com [online], copyright 2013 [retrieved on Aug. 15, 2013]. Retrieved from the Internet: <URL: http://www.air-watch.com/solutions/mobile-device-management>, 6 pages.

Airwatch, "Mobile Device Management," air-watch.com [online], brochure created Feb 21, 2013, [retrieved on Aug. 15, 2013]. Retrieved from the Internet: <URL: http://www.air-watch.com/downloads/brochures/AirWatch_brbrochu_mobile_device_management.pdf> 2 pages.

BoxTone, "Automated mobile device management," boxtone.com [online], copyright 2012, [retrieved on Aug. 15, 2013]. Retrieved from the Internet: <URL: http://boxtone.com/mobile-device-management.aspx>, 2 pages.

Cisco Meraki, "Cloud managed networks that simply work," meraki.cisco.com [online], [retrieved on Aug. 15, 2013]. Retrieved from the Internet: <URL: http://meraki.cisco.com/products/systems-manager>, 4 pages.

IBM, "Endpoint manager for mobile devices setup guide," created Feb. 16, 2013 [retrieved on Aug. 15, 2013]. Retrieved from the Internet: <URL: http://pic.dhe.ibm.com/infocenter/tivihelp/v26r1/topic/com.ibm.tem.doc_8.2/MDM_Setup_Guide.pdf> 32 pages.

Microsoft, "How to install clients on mobile devices and enroll them by using configuration manager," technet.microsoft.com [online], Jun. 2013 [retrieved on Aug. 15, 2013]. Retrieved from the Internet:<URL: http://technet.microsoft.com/en-us/library/gg712327.aspx> 15 pages.

* cited by examiner

SWITCHING BETWEEN NETWORKS

TECHNICAL FIELD

This specification relates to systems and techniques that facilitate switching between compliant and non-compliant networks.

BACKGROUND

In corporate and other networks, users may be required to authenticate to a proxy server prior to accessing the Internet. One widely used authentication scheme is Hypertext Transfer Protocol (HTTP) Basic Authentication. In Basic Authentication, a client sends its username and password in unencrypted plaintext to a server, such as, for example, a proxy server. The server authenticates the client and subsequently allows the client access to other resources, such as the Internet. In such a configuration, an attacker can monitor network packets to obtain the username and password of the client, and possibly compromise the security of the network.

SUMMARY

In general, one aspect of the subject matter described in this specification can be embodied in methods that include the actions of maintaining a plurality of parallel networks including a first network that precludes access to secure resources, and a second network that provides access both to unsecured resources and secured resources, enabling a user device access to connect to the first network, receiving input from the user device seeking access to one or more secured resources, in response to the received input, installing a device management profile on the user device, and causing the user device to switch from the connection to the first network to a connection to the second network. Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them, installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In particular, one implementation may include all the following features in combination. The device management profile may comprise a mobile device management profile, and/or may comprise instructions that cause the user device to switch from the first network to the second network. The device management profile may comprise one or more settings that allow the user device to connect to the second network. The settings may comprise a password for the second network.

In some implementations, the method further comprises detecting that the device management profile is no longer active on the user device, and causing the user device to switch from the connection to the second network to a connection to the first network. The causing the user device to switch from the connection to the second network to a connection to the first network may comprise creating a new connection between the first network and the user device. The detecting that the device management profile is no longer active on the user device may comprise detecting that the device management profile is uninstalled from the user device. The method may further comprise automatically removing a profile from the user device where the device management profile installed the profile on the user device.

In some implementations, the method further comprises, prior to installing the device management profile on the user device, requesting login credentials from the user device, receiving login credentials from the user device, and determining whether the received login credentials are valid, wherein the device management profile is installed on the user device based on determining that the login credentials are valid.

In some implementations, a single network connection point broadcasts both the first network and the second network. Enabling the user device access to connect to the first network may comprise assigning the user device a first internet protocol address from a first range of internet protocol addresses associated with the first network, and causing the user device to switch from the connection to the first network to the connection to the second network may comprise assigning the user device a second internet protocol address from a second range of internet protocol addresses associated with the second network, the first range and the second range being mutually exclusive.

The subject matter described in this specification may be implemented in various implementations to realize one or more of the following potential advantages. In some implementations, the use of parallel networks allows a user device to more easily switch between a non-compliant network and a compliant network (e.g., with secure resources).

Details of one or more implementations are set forth in the accompanying drawings and the description below. Other features, aspects, and potential advantages will become apparent from the description, the drawings, and the claims.

BRIEF DESCRIPTION OF THE DRAWINGS

Like reference numbers and designations in the various drawings indicate like elements.

DETAILED DESCRIPTION

To allow a user device access to an in-compliance network and secure resources, the user device first accesses an out-of-compliance network and receives a device management profile that configures the user device for access to the in-compliance network. For example, the user device connects to a first wireless network that allows the user device to request the device management profile and access un-secure resources. The user device may provide an access control system with user credentials of the operator of the user device and the access control system provides the device management profile to the user device upon verification of the credentials.

Upon receiving the device management profile, the user device installs the device management profile and the device management profile configures one or more settings of the user device to provide the user device with access to the in-compliance network and any resources accessible with the in-compliance network.

For example, the use of the out-of-compliance network and the in-compliance network may allow employees of an organization to bring their own devices to work and access unsecure resources without installing the device management profile on their own devices while requiring the device management profile to be installed on the devices to allow access to the secure resources retrieved with the in-compliance network.

Figure 1:
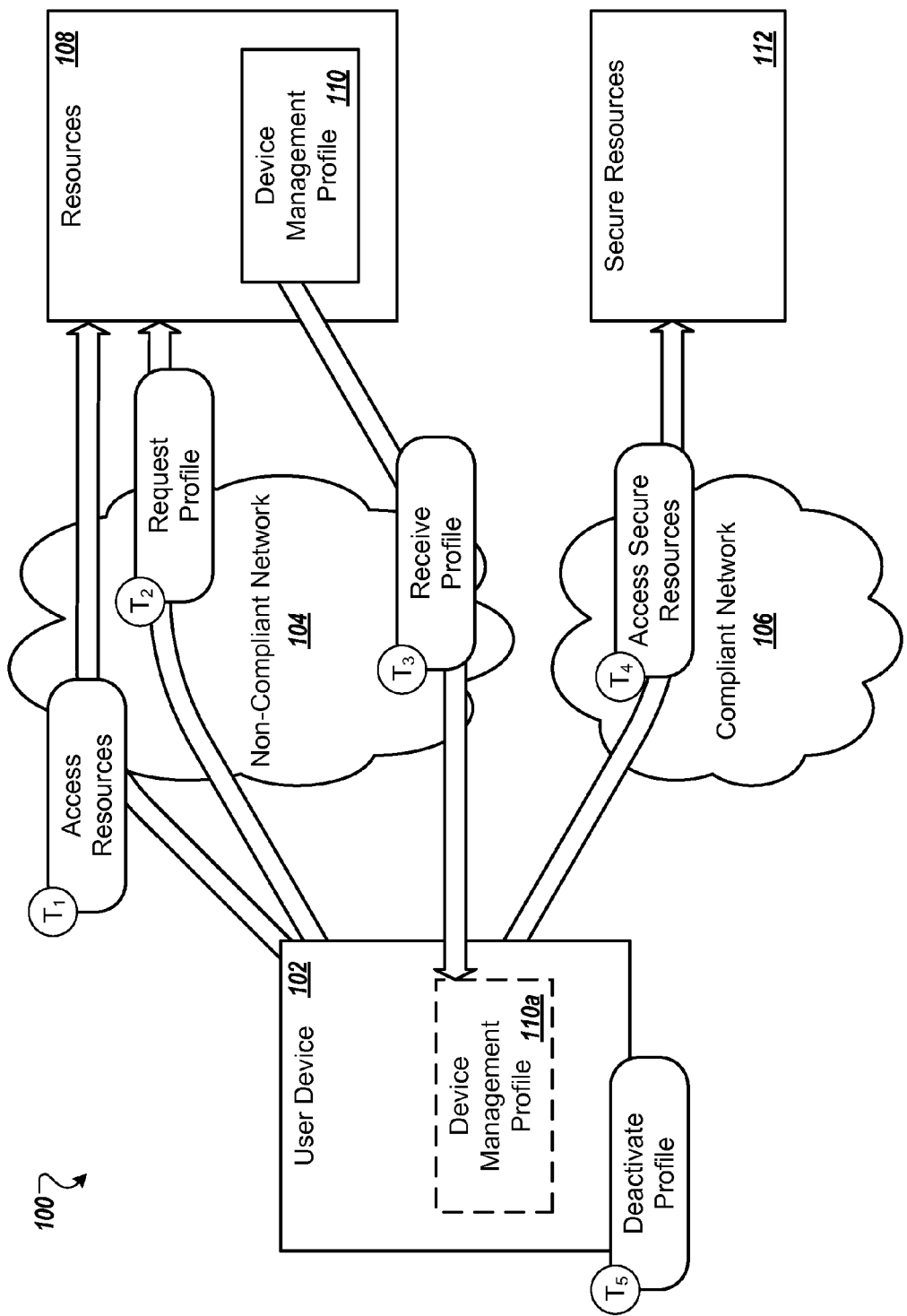
FIG. 1 is an example of a network system configured to install a device management profile on a user device.

FIG. 1 is an example of a network system 100 configured to install a device management profile on a user device 102. The user device 102 receives the device management profile while connected to a non-compliant network 104 and the device management profile allows the user device 102 to access a compliant network 106.

For example, when an employee of an organization brings the user device 102, e.g., a tablet, to work and accesses a wireless network provided by the organization, the user device 102 is able to connect to the non-compliant network 104, at time $T_1$, that provides access to a plurality of resources 108, including the device management profile 110, but does not allow the user device 102 access to a plurality of secure resources 112.

When the user device 102 connects to the non-compliant network 104, the user device 102 may be directed toward a landing page associated with the device management profile 110, or the employee operating the user device 102 may request the landing page. For example, the landing page may allow the employee to enter credentials, e.g., a username and password, and request, at time $T_2$, that the user device 102 receive a copy of the device management profile 110. In some examples, the request is a request for access to the secure resources 112 and the employee operating the user device 102 may be unaware of the use of the device management profile 110.

At time $T_3$, the user device 102 receives the device management profile 110a and installs the device management profile 110a, e.g., in a memory on the user device 102. Upon installation, the device management profile 110a configures one or more settings of the user device 102 to allow the device to access the compliant network 106 and the secure resources 112. For example, the device management profile 110a configures a password on the user device 102 for the compliant network 106.

The user device 102 may then access, at time $T_4$, the secure resources 112. The secure resources 112 may be secure resources for all the employees of the organization, secure resources associated with the particular employee operating the user device 102, a combination of different types or permissions of secure resources, among other types of resources that are not accessible through the non-compliant network 104.

When the user device 102 connects to the compliant network 106, the user device 102 may also access the resources 108. For example, when the non-compliant network 104 allows the user device 102 access to the device management profile 110 and Internet resources, the compliant network 106 provides the user device 102 with access to the device management profile 110, the secure resources 112, and Internet resources.

In some implementations, one or more security policies for the compliant network 106 may be different from the security policies for the non-compliant network 104. For example, when the user device 102 connects to the non-compliant network 104 the user device 102 may have access to a first web page, e.g., a social media page, that the user device 102 is unable to access when connecting to the compliant network 106.

When the employee operating the user device 102 deactivates the device management profile 110a, e.g., uninstalls or disables the device management profile 110a, at time $T_5$, the network system 100 detects that the device management profile 110a is deactivated and switches the network connection of the user device from the compliant network 106 to the non-compliant network 104. For example, the employee operating the user device 102 may no longer require access to the secure resources 112 and may deactivate the device management profile 110a located on the user device 102. When the compliant network 106 detects that the device management profile 110a is deactivated, the compliant network 106 disables the connection with the user device 102 and the user device 102 connects to the non-compliant network 104, e.g., based on the settings of the user device 102. The user device 102 may then access only the resources 108 and not the secure resources 112, similar to time $T_1$ prior to receipt of the device management profile 110a by the user device 102.

The user device 102 may include personal computers, mobile communication devices, and other devices that can send and receive data over the compliant network 106. The compliant network 106, such as a local area network (LAN), wide area network (WAN), the Internet, or a combination thereof, connects the user device 102, the resources 108, and the secure resources 112. The non-compliant network 104, such as a local area network (LAN), wide area network (WAN), the Internet, or a combination thereof, connects the user device and the resources 108.

In some implementations, the non-compliant network 104 only provides the user device 102 with access to the device management profile 110. For example, when the user device 102 accesses the non-compliant network 104, the user device 102 receives instructions for presentation of a web page that allows an operator to view information about the device management profile 110 and request a copy of the device management profile 110 for access to the secure resources 112.

Figure 2:
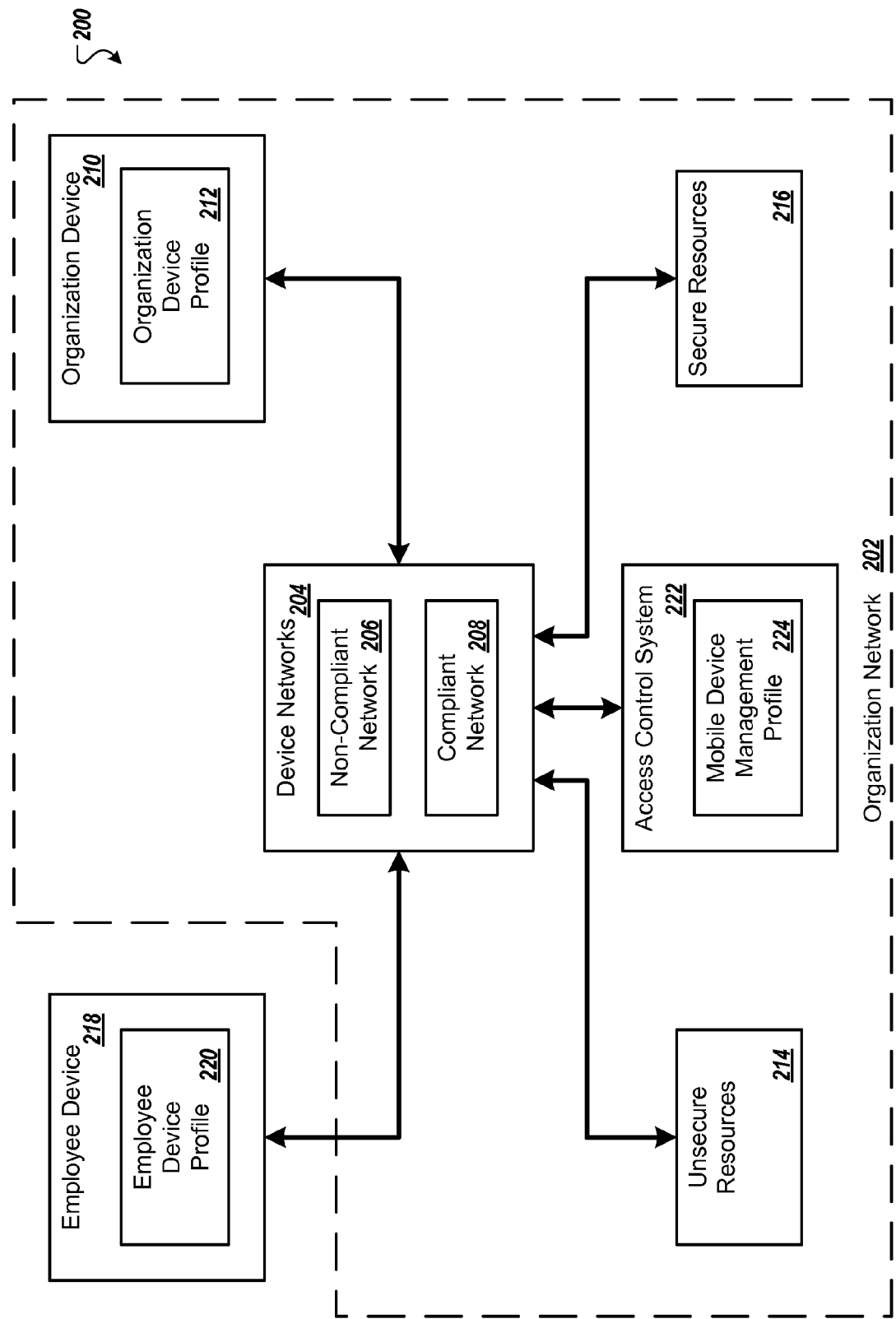
FIG. 2 is a block diagram of an environment in which an organization network provides access to one of a plurality of device networks.

FIG. 2 is a block diagram of an environment 200 in which an organization network 202 provides access to one of a plurality of device networks 204. For example, the device networks 204 include a non-compliant network 206 and a compliant network 208.

When an organization device 210, e.g., provided by the organization to an employee of the organization, connects to the device networks 204, the organization device 210 automatically creates a connection with the compliant network 208 based on an organization device profile 212 installed on the organization device 210. The compliant network 208 allows the organization device 210 access to a plurality of unsecure resources 214 and a plurality of secure resources 216. For example, the unsecure resources 214 may include a web site for the organization and the secure resources 216 may include the organization's confidential documents.

When an employee of the organization initially connects an employee device 218 to the device networks 204, the employee device 218 creates a connection with the non-compliant network 206 based on an employee device profile 220 of the employee device 218. The non-compliant network 206 provides the employee device 218 with access to the unsecure resources 214 and does not allow the employee device 218 to access the secure resources 216.

When the employee device 218 requests access to one of the secure resources 216, the non-compliant network 206 connects the employee device 218 to an access control system 222 that installs a mobile device management profile 224 on the employee device 218. For example, the mobile device management profile 224 replaces the employee device profile 220 or updates one or more settings associated with the employee device 218 and/or the employee device profile 220.

In some implementations, the non-compliant network 206 and the compliant network 208 are both wireless networks. For example, a first network connection point broadcasts the non-compliant network 206 and a second network connection point broadcasts the compliant network 208. In some examples, the same network connection point provides access to both the non-compliant network 206 and the compliant network 208.

In some implementations, the non-compliant network 206 and the compliant network 208 are different types of networks. For example, the non-compliant network 206 may provide low bandwidth access to resources and the compliant network 208 may provide high bandwidth access to resources. In some examples, the non-compliant network 206 and the compliant network 208 provide the same maximum bandwidth but the non-compliant network 206 has a lower maximum bandwidth for each device connection than the compliant network 208.

In some implementations, the non-compliant network 206 is a wired network and the compliant network 208 is a wireless network. For example, when an employee brings the employee device 218 to the organization network 202, the employee device 218 connects to the non-compliant network 206 with a wired connection to receive a copy of the mobile device management profile 224 and then connects to the compliant network 208 wirelessly.

In some implementations, when the employee device 218 first connects to the device networks 204, a connection between the employee device 218 and the non-compliant network 206 is created and the organization network 202 provides the employee device 218 with instructions to present a landing page associated with the mobile device management profile 224 and/or the secure resources 216. For example, when the non-compliant network 206 only provides access to the landing page, the employee device 218 receives instructions to present a user interface that provides the employee operating the employee device 218 with instructions for gaining access to the secure resources 216.

In some implementations, when the mobile device management profile 224 on the employee device 218 is deactivated, the employee device 218 restores the original settings for the employee device profile 220. For example, when the employee device 218 is configured to connect to the non-compliant network 206 and receives the mobile device management profile 224 from the organization network 202, the mobile device management profile 224 adjusts one or more settings on the employee device 218 to allow access to the compliant network 208 and specifying the compliant network 208 as a preferred network compared to the non-compliant network 206. When the mobile device management profile 224 is deactivated, the one or more adjusted settings are restored to their previous values and the employee device 218 is no longer able to connect to the compliant network 208.

In some implementations, when the mobile device management profile 224 is uninstalled from the employee device 218, the employee device 218 automatically removes any profiles and/or settings associated with the mobile device management profile 224 from the employee device 218. For example, any profiles installed on the employee device 218 by the mobile device management profile 224 are removed from the employee device 218 when the mobile device management profile 224 is uninstalled. In these implementations, the employee device 218 loses access to the compliant network 208. For example, the employee device 218 instantaneously loses access to the compliant network when the mobile device management profile 224 is uninstalled from the employee device 218. In some examples, an operating system of the employee device 218 automatically removes any profiles and/or settings associated with the mobile device management profile 224 when the mobile device management profile 224 is uninstalled from the employee device 218. In some examples, another application on the employee device 218 removes any profiles and/or settings associated with the mobile device management profile 224 from the employee device 218.

In some implementations, when the mobile device management profile 224 on the employee device 218 is deactivated, the employee device 218 automatically disconnects from the compliant network 208. For example, the mobile device management profile 224 adjusts a setting on the employee device 218 that prevents the employee device 218 from connecting to the compliant network 208 upon deactivation of the mobile device management profile 224. Once the employee device 218 determines that the mobile device management profile 224 is deactivated, the employee device 218 automatically disconnects from the compliant network 208 within a predetermined period of time.

In some implementations, the non-compliant network 206 and the compliant network 208 are part of the same network connection in the device networks 204. For example, the organization network 202 may assign a first range of internet protocol addresses for the non-compliant network 206 and a second range of internet protocol addresses for the compliant network 208 where the first range and the second range do not overlap. When the organization device 210 connects to the device networks 204, the organization device 210 is assigned an IP address from the second range of internet protocol addresses associated with the compliant network 208 and allowed access to the unsecure resources 214 and the secure resources 216.

When the employee device 218 initially connects to the organization network 202, the employee device 218 is assigned an IP address from the first range of internet protocol addresses associated with the non-compliant network 206. When the organization network 202 receives a resource request from the employee device 218, the organization network 202 determines the IP address of the employee device 218 and whether the IP address is associated with the first range or the second range to control the access of the employee device 218 to the requested resource.

Upon installation of the mobile device management profile 224 on the employee device 218, the employee device 218 is assigned a different IP address selected from the second range of internet protocol addresses and allowed to access all of the resources available to the employee operating the employee device 218, e.g., based on permissions associated with the employee.

In some implementations, the non-compliant network 206 and/or the compliant network 208 are associated with multiple ranges of IP addresses. For example, a first employee's device, after receiving a copy of the mobile device management profile 224, may have access to a first set of resources associated with a first range of compliant internet protocol addresses and a second employee's device, after receiving a copy of the mobile device management profile 224, may have access to a second set of resources associated with a second range of compliant internet protocol addresses, where the first and second ranges of compliant internet protocol addresses do not overlap and at least some of the resources in the first set of resources are different than the resources in the second set of resources.

Figure 3:
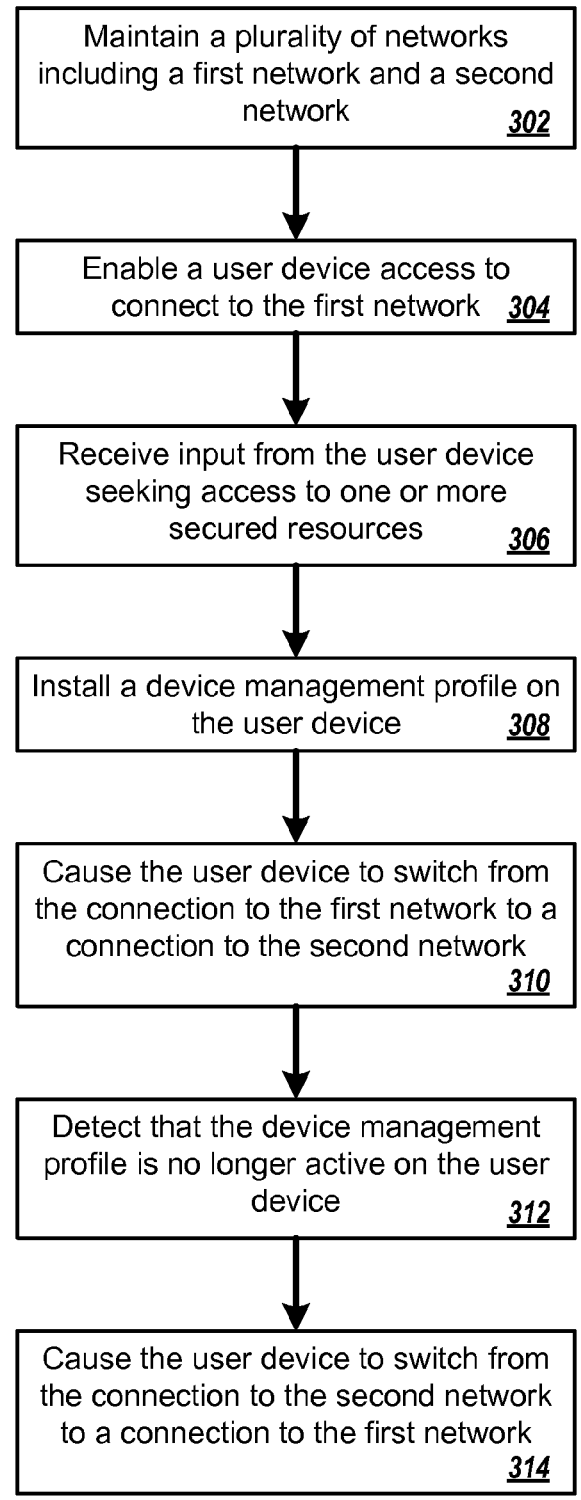
FIG. 3 is a flow diagram of a process for causing a user device to switch from a connection to a first network to a connection to a second network.

FIG. 3 is a flow diagram of a process 300 for causing a user device to switch from a connection to a first network to a connection to a second network. The process 300 can be used by the organization network 202 from the environment 200.

The process maintains a plurality of networks including a first network and a second network (302). The first network precludes access to secure resources, and the second network provides access both to unsecured resources and secured resources. For example, the second network provides employees access to confidential files and the first network does not provide access to the confidential files.

In some implementations, both the first network and the second network are wireless networks. In some implementations, both the first network and the second network are wired networks. In some implementations, one of the networks is wired and the other network is wireless. For example, the first network may be a wired network and the second network may be a wireless network.

The process enables a user device access to connect to the first network (304). For example, the first network is an unsecured network that does not require a password to gain access to the network. In some examples, the first network is a wireless network and the user device connects to the first network.

The process receives input from the user device seeking access to one or more secured resources (306). For example, an employee operating the user device uses a web browser on the user device to navigate to a web page that allows the employee to request access to the secured resources. In some examples, the web page lists different types of secured resources to which the employee may request access. In some examples, the web page is a general web page that allows the employee to request access to any secured resources available to the employee, e.g., and associated with the particular organization that manages the second network. In some examples, when the user device connects to the first network, the user device is provided with instructions to present the web page to the employee operating the user device and upon employee selection of the web browser the user device presents the web page in the web browser.

The process installs a device management profile on the user device (308). For example, after receiving the request for access to the secured resources from the user device, the organization network provides the device management profile to the user device so the device management profile can configure one or more settings of the user device to allow the user device to create a connection with the second network.

In some implementations, the process requests login credentials from the user device and verifies received credentials prior to providing the device management profile to the user device. For example, the process receives login credentials from the user device and determines whether the received login credentials are valid. The device management profile is then installed on the user device based on determining that the login credentials are valid.

In some implementations, the device management profile includes instructions that cause the user device to switch from the first network to the second network. For example, the device management profile may include one or more settings that allow the user device to connect to the second network. In some examples, the settings may include a password for the second network.

In some implementations, the device management profile is a mobile device management profile.

The process causes the user device to switch from the connection to the first network to a connection to the second network (310). For example, the device management profile configures the one or more settings of the user device including a setting that indicates that the second network is preferred over the first network and that when both networks are available the user device should connect to the second network. The user device may then determine that both network connections are available, disconnect from the first network and create a connection with the second network.

The process detects that the device management profile is no longer active on the user device (312). For example, the employee operating the user device may deactivate, e.g., disable or uninstall, the device management profile.

In some implementations, when the user device determines that the device management profile is no longer active, the user device sends the organization network a message indicating that the device management profile is no longer active.

The process causes the user device to switch from the connection to the second network to a connection to the first network (314). For example, the user device disconnects from the second network and creates a connection with the first network.

In some implementations, where the user device sends a message to the organization network when the device management profile is no longer active, the organization network disables the connection between the user device and the second network. In some examples, the user device sends a message to the organization network indicating that a password used by the user device to connect to the second network is no longer active. For example, the device management profile configures a setting on the user device to send the password expiration message to the organization network when the device management profile is no longer active.

In some implementations, when the user device determines that the device management profile is no longer active, the user device disconnects from the second network. For example, the device management profile configures a setting that instructs the user device to disconnect from the second network when the device management profile is no longer active.

In some implementations, the process creates a new connection between the first network and the user device. For example, the user device creates a new connection with the first network. In some implementations, the user device re-enables the old connection with the first network.

The order of steps in the process 300 described above is illustrative only, and causing a user device to switch from a connection to a first network to a connection to a second network can be performed in different orders. For example, when the user device already has the device management profile installed, e.g., upon returning to the organization network a second time, the process may detect that the device management profile is no longer active and cause the user device to switch from the second network to the first network prior to re-installing the device management profile on the user device. In these implementations, the device management profile may be installed on the user device a second time or, when the device management profile is disabled but remains installed on the user device, the device management profile may be re-enabled to cause the user device to switch from the first network to the second network.

In some implementations, the process 300 can include additional steps, fewer steps, or some of the steps can be divided into multiple steps. For example, the process 300 may perform steps 302 through 310 and not perform steps 312 and 314. In some implementations, the process may perform steps 304 through 310 and not perform the steps 302 and 312 through 314.

In some implementations, a single network connection point broadcasts both the first network and the second network. For example, the process 300 enables the user device access to connect to the first network by assigning the user device a first internet protocol address from a first range of internet protocol addresses associated with the first network, and causes the user device to switch from the connection to the first network to the connection to the second network by assigning the user device a second internet protocol address from a second range of internet protocol addresses associated with the second network, where the first range and the second range are mutually exclusive.

In some implementations, the process installs one or more organization applications on the user device when the mobile device management application is enabled. In these implementations, when an operator of the user device deactivates the device management profile, the process prevents the user device from executing the organization applications. For example, when the device management profile is deactivated and the user device receives a launch application selection from the operator, where the launch application selection instructs the user device to execute one of the organization applications, the user device may activate the device management profile prior to the execution of the one of the organization applications and based on receiving the launch application selection.

Figure 4:
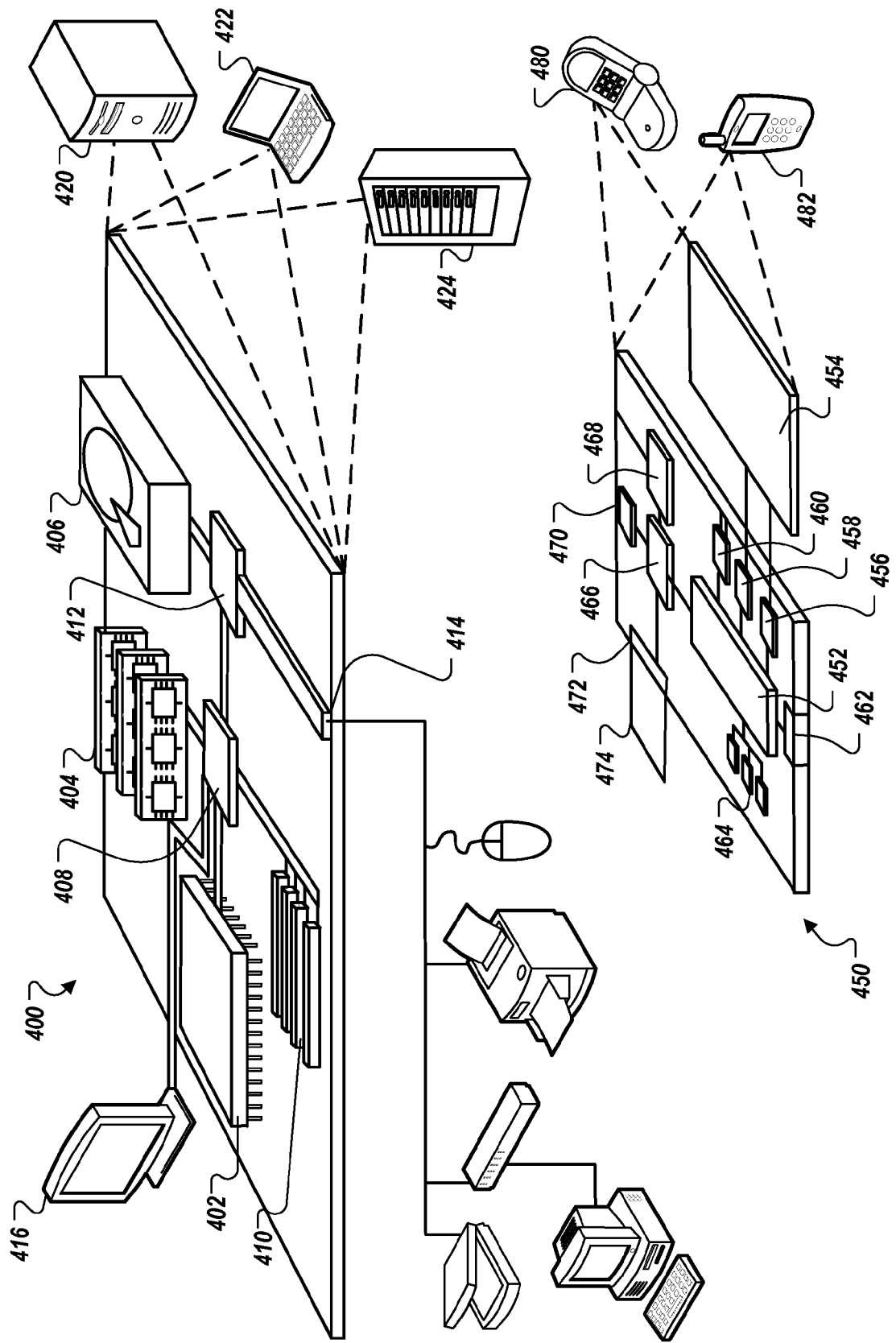
FIG. 4 is a block diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high speed interface 408 connecting to memory 404 and high speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high speed controller 408 is coupled to memory 404, display 416 (e.g., through a graphics processor or accelerator), and to high speed expansion ports 410, which may accept various expansion cards (not shown). In the implementation, low speed controller 412 is coupled to storage device 406 and low speed expansion port 414. The low speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 402 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

This document describes technologies that can be applied to a wide range of uses, which are designed and intended to be beneficial for all users involved. However, some of the technologies described may be put to illegitimate, malicious, and even illegal ends by bad actors. This is true with almost any technology, but there is often a greater sensitivity when a technology interacts with a user's security and private information. The described technologies all are designed to operate in an environment and in a manner that respects the rights of all users. As such, features such as user notification, opt-in and opt-out procedures, and privacy settings are available options to be used to ensure user security and privacy are respected.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A method performed by a data processing apparatus, the method comprising:
   maintaining a plurality of networks including a first network that precludes access to secure resources, and a second network that provides access both to unsecure resources and the secure resources;
   enabling, by the data processing apparatus, a user device to create a first connection with the first network that precludes access to the secure resources;
   receiving, by the data processing apparatus, a request from the user device over the first connection with the first network that precludes access to secure resources seeking access to one or more of the secure resources;
   in response to receiving the request from the user device over the first connection with the first network that precludes access to secure resources seeking access to the one or more of the secure resources, sending, by the data processing apparatus, a device management profile to the user device over the first network that precludes access to secure resources, the device management profile configured to be installed on the user device and cause the user device to create a new second connection to the second network that provides access to the secure resources and switch from the first connection to the first network to the new second connection to the second network; and
   enabling, by the data processing apparatus, the user device access to the requested one or more of the secure resources over the second network.

2. The method of claim 1, wherein the device management profile comprises a mobile device management profile.

3. The method of claim 1, wherein the device management profile comprises instructions that cause the user device to create the new second connection to the second network and switch from the first connection to the first network to the new second connection to the second network.

4. The method of claim 3, wherein the device management profile comprises one or more network connection settings that enable the user device to create the new second connection with the second network.

5. The method of claim 4, wherein the settings comprise a password for the second network.

6. The method of claim 1, further comprising:
   detecting that the device management profile is no longer active on the user device; and
   in response to detecting that the device management profile is no longer active on the user device, causing the user device to switch from the second connection to the second network to a third connection to the first network.

7. The method of claim 6, wherein causing the user device to switch from the second connection to the second network to the third connection to the first network comprises creating a new third connection between the first network and the user device.

8. The method of claim 6, wherein detecting that the device management profile is no longer active on the user device comprises detecting that the device management profile is uninstalled from the user device,
   the method further comprising automatically removing a profile from the user device wherein the device management profile installed the profile on the user device.

9. The method of claim 1, further comprising:
   prior to sending the device management profile to the user device over the first network that precludes access to secure resources, requesting login credentials from the user device;
   in response to requesting login credentials from the user device, receiving login credentials from the user device; and
   determining whether the received login credentials are valid, wherein the device management profile is sent to the user device based on determining that the received login credentials are valid.

10. The method of claim 1, wherein
    a single network connection point broadcasts both the first network and the second network,
    enabling the user device to create the first connection with the first network comprises assigning the user device a first internet protocol address from a first range of internet protocol addresses associated with the first network; and
    causing the user device to create the new second connection to the second network and switch from the first connection to the first network to the new second connection to the second network comprises assigning the user device a second internet protocol address from a second range of internet protocol addresses associated with the second network, the first range and the second range being mutually exclusive.

11. A non-transitory computer storage medium encoded with instructions executable by one or more computers that cause the one or more computers to perform operations comprising:
    maintaining a plurality of networks including a first network that precludes access to secure resources, and a second network that provides access both to unsecure resources and the secure resources;
    enabling, by the one or more computers, a user device to create a first connection with the first network that precludes access to the secure resources;
    receiving, by the one or more computers, a request from the user device over the first connection with the first network that precludes access to secure resources seeking access to one or more of the secure resources;

in response to receiving the request from the user device over the first connection with the first network that precludes access to secure resources seeking access to the one or more of the secure resources, sending, by the one or more computers, a device management profile to the user device over the first network that precludes access to secure resources, the device management profile configured to be installed on the user device and cause the user device to create a new second connection to the second network that provides access to the secure resources and switch from the first connection to the first network to the new second connection to the second network; and enabling, by the one or more computers, the user device access to the requested one or more of the secure resources over the second network.

12. The computer storage medium of claim 11, wherein the device management profile comprises a mobile device management profile.

13. The computer storage medium of claim 11, wherein the device management profile comprises instructions that cause the user device to create the new second connection to the second network and switch from the first connection to the first network to the new second connection to the second network.

14. The computer storage medium of claim 13, wherein the device management profile comprises one or more network connection settings that enable the user device to create the new second connection with the second network.

15. The computer storage medium of claim 14, wherein the settings comprise a password for the second network.

16. The computer storage medium of claim 11, the operations further comprising:

detecting that the device management profile is no longer active on the user device; and in response to detecting that the device management profile is no longer active on the user device, causing the user device to switch from the second connection to the second network to a third connection to the first network.

17. The computer storage medium of claim 16, wherein causing the user device to switch from the second connection to the second network to the third connection to the first network comprises creating a new third connection between the first network and the user device.

18. The computer storage medium of claim 16, wherein detecting that the device management profile is no longer active on the user device comprises detecting that the device management profile is uninstalled from the user device, the operations further comprising automatically removing a profile from the user device wherein the device management profile installed the profile on the user device.

19. The computer storage medium of claim 11, the operations further comprising:

prior to sending the device management profile to the user device over the first network that precludes access to secure resources, requesting login credentials from the user device;

in response to requesting login credentials from the user device, receiving login credentials from the user device; and determining whether the received login credentials are valid, wherein the device management profile is sent to the user device based on determining that the received login credentials are valid.

20. The computer storage medium of claim 11, wherein a single network connection point broadcasts both the first network and the second network, enabling the user device to create the first connection with the first network comprises assigning the user device a first internet protocol address from a first range of internet protocol addresses associated with the first network; and causing the user device to create the new second connection to the second network and switch from the first connection to the first network to the new second connection to the second network comprises assigning the user device a second internet protocol address from a second range of internet protocol addresses associated with the second network, the first range and the second range being mutually exclusive.

21. A system comprising: one or more computers and one or more storage devices storing instructions executable by the one or more computers that cause the one or more computers to perform operations comprising:

maintaining a plurality of networks including a first network that precludes access to secure resources, and a second network that provides access both to unsecure resources and the secure resources;

enabling, by the one or more computers, a user device to create a first connection with the first network that precludes access to the secure resources;

receiving, by the one or more computers, a request from the user device over the first connection with the first network that precludes access to secure resources seeking access to one or more of the secure resources;

in response to receiving the request from the user device over the first connection with the first network that precludes access to secure resources seeking access to the one or more of the secure resources, sending, by the one or more computers, a device management profile to the user device over the first network that precludes access to secure resources, the device management profile configured to be installed on the user device and cause the user device to create a new second connection to the second network that provides access to the secure resources and switch from the first connection to the first network to the new second connection to the second network; and enabling, by the one or more computers, the user device access to the requested one or more of the secure resources over the second network.

22. The system of claim 21, wherein the device management profile comprises a mobile device management profile.

23. The system of claim 21, wherein the device management profile comprises instructions that cause the user device to create the new second connection to the second network and switch from the first connection to the first network to the new second connection to the second network.

24. The system of claim 23, wherein the device management profile comprises one or more network connection settings that enable the user device to create the new second connection with the second network.

25. The system of claim 24, wherein the settings comprise a password for the second network.

26. The system of claim 21, the operations further comprising:

detecting that the device management profile is no longer active on the user device; and in response to detecting that the device management profile is no longer active on the user device, causing the user device to switch from the second connection to the second network to a third connection to the first network.

27. The system of claim 26, wherein causing the user device to switch from the second connection to the second network to the third connection to the first network comprises creating a new third connection between the first network and the user device.

28. The system of claim 26, wherein detecting that the device management profile is no longer active on the user device comprises detecting that the device management profile is uninstalled from the user device,
the operations further comprising automatically removing a profile from the user device wherein the device management profile installed the profile on the user device.

29. The system of claim 21, the operations further comprising:
prior to sending the device management profile to the user device over the first network that precludes access to secure resources, requesting login credentials from the user device;
in response to requesting login credentials from the user device, receiving login credentials from the user device; and
determining whether the received login credentials are valid, wherein the device management profile is sent to the user device based on determining that the received login credentials are valid.

30. The system of claim 21, wherein
a single network connection point broadcasts both the first network and the second network,
enabling the user device to create the first connection with the first network comprises assigning the user device a first internet protocol address from a first range of internet protocol addresses associated with the first network; and
causing the user device to create the new second connection to the second network and switch from the first connection to the first network to the new second connection to the second network comprises assigning the user device a second internet protocol address from a second range of internet protocol addresses associated with the second network, the first range and the second range being mutually exclusive.

\* \* \* \* \*